Nov. 2, 1954  C. E. TERRELL  2,693,110
VALVE EMBODYING FLUID MEASURING MEANS
Filed May 7, 1951

INVENTOR.
CHARLES E. TERRELL
BY
Jennings & Carter
ATTORNEYS

United States Patent Office 2,693,110
Patented Nov. 2, 1954

2,693,110

VALVE EMBODYING FLUID MEASURING MEANS

Charles E. Terrell, Birmingham, Ala.

Application May 7, 1951, Serial No. 224,977

1 Claim. (Cl. 73—213)

My present invention relates to valves and more particularly to valves embodying means associated therewith by which the volume of fluids such as liquids and gases flowing through the valve may be measured, thereby permitting the valve to function as a volume measuring device without disturbing or modifying its ordinary function of controlling the flow of the fluid in the line in which the valve is installed.

An object of my invention is to associate with the venturi housing of a valve a tap or opening in communication with the housing and located in the area of greatest constriction therein, in combination with a second tap or pressure take-off disposed outside said area, whereby the differential in pressure between the taps may be employed to calculate the volume of fluid passing through the valve.

Another object is to provide in a valve having a venturi shaped housing and a movable closure, one pressure connection to the housing in communication with the opening in the valve at the point or area of greatest constriction, such communication being effected by means of an opening in the closure which aligns with the opening in the housing when the valve is opened, together with a second pressure connection to the upstream side of the valve or conduit controlled thereby, whereby, through the use of a pressure differential indicator the flow through the valve may be determined.

My invention comprehends means of the character designated which may with equal facility be associated with valves of the type having rotary or sliding closures and which, when associated with either of said types of valves may, through association therewith of pressure differential indicating mechanism, be used to determine the volume of fluid passing through the valve.

Apparatus illustrating the features of my invention is shown in the accompanying drawings forming a part of this application in which.

Figure 1:
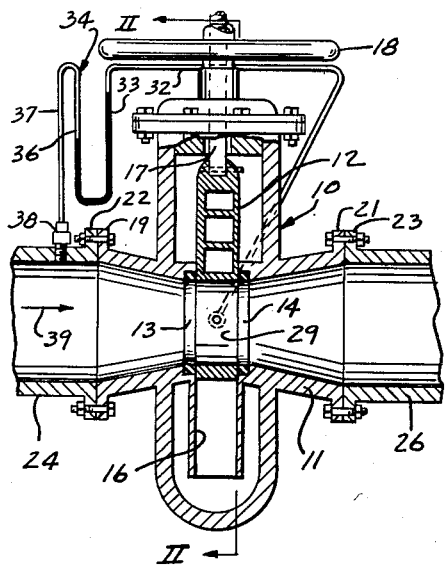
Fig. 1 is a somewhat diagrammatic longitudinal sectional view of a well known form of gate valve having a venturi shaped housing and showing the valve in fully opened position.
Figure 2:
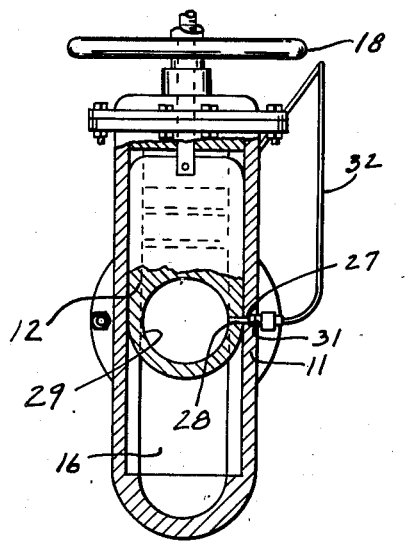
Fig. 2 is a detail sectional view taken generally along line II—II of Fig. 1.

Referring now to the drawings for a better understanding of my invention and more particularly to Figs. 1 and 2, I show my invention associated with a valve 10 of a well known type. In the instance illustrated the valve 10 comprises a housing 11 of venturi shape. Adjacent its longitudinal mid-point the housing 11 reaches its maximum point of constriction. At this point there is provided a slidable plate or closure member 12. The plate 12 is supported for movement between seals 13 and 14 and is movable from the fully open position illustrated in Figs. 1 and 2 to a lower position into a well 16 provided therefor. The plate 12 may be moved in the manner understood by means of a screw 17 together with a manually operated hand nut 18. The valve may be provided with flanges 19 and 21 which connect to complementary flanges 22 and 23 of pipes or conduits 24 and 26.

In the side of the housing 11, preferably at the longitudinal mid-point of the area of maximum constriction thereof is a radially disposed opening 27. As illustrated, the opening 27 communicates with an opening 28 provided in the plate 12. As understood, the plate is provided with a centrally disposed opening 29 which comes into alignment with the through opening of the valve housing when the plate is moved to the position shown in the drawings. Thus there exists, when the valve is open, direct communication to the fluid flowing in the valve, and this connection is located in the area of maximum constriction within the venturi shaped housing.

Connected to the opening 27 in the housing 11, as by means of a threaded adaptor 31 is a tube 32. The tube 32 is connected to the upper end of one leg 33 of a manometer 34, or to any other suitable pressure differential indicating mechanism. The opposite leg 36 of the manometer is connected by a tube 37 through an adaptor 38 into the conduit 24.

From the description just given it will be seen that when the valve 10 is in fully open position the openings 27 and 28 are in alignment. Tube 32 therefore communicates with the inside of the valve, at the point therein of maximum constriction. When fluid is moving through the valve in the direction indicated by arrow 39 it will be apparent from the application of the well known venturi formula as modified by empirical constants for the given valve under consideration, the volume flowing through the valve may be accurately calculated. Further, it will be noted that the valve 10 is in no way impaired by the provision of the openings 27 and 28. I have thus incorporated in a valve having a venturi body means which may be employed to utilize such valve both as fluid control and volume measuring apparatus. It will also be noted that the opening 28 aligns with the opening 27 on a radial line passing through the center of the opening 29 of the closure member 12. I thus assure accurate alignment of the openings and hence assure that the manometer reads the pressure differential accurately. No additional seal means for the valve 10 is needed due to the provision of the openings 27 and 28 and hence any ordinary, standard valve of the type shown may, through use of the means disclosed herein, be modified simply and quickly to the purposes at hand.

Figures 3, 4, 5, 6:
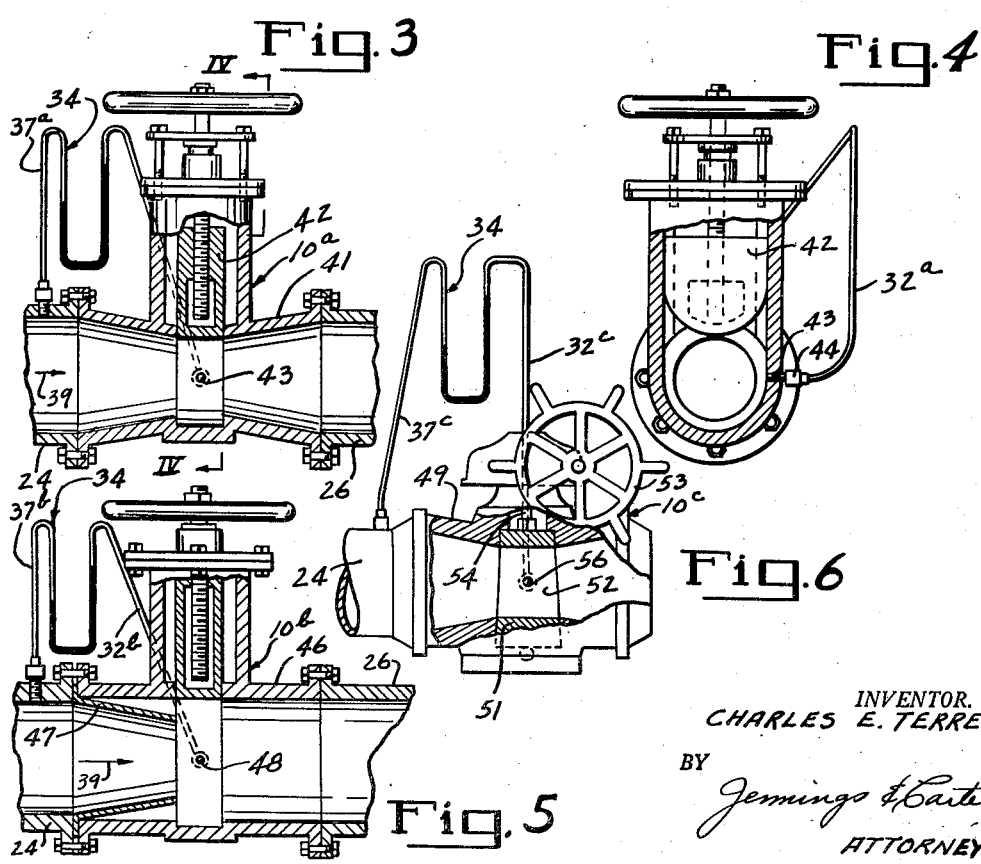
Fig. 3 is a longitudinal sectional view of a different form of gate valve from that shown in Figs. 1 and 2, the valve illustrated also embodying a venturi shaped housing.
Fig. 4 is a detail sectional view taken generally along line IV—IV of Fig. 3.
Fig. 5 is a view corresponding to Figs. 1 and 3 and showing a still further modified form of gate valve in which the venturi effect is obtained by inserting in a cylindrical valve body a frusto-conical shaped member; and, Fig. 6 is a side elevational view, partly broken away and in section and illustrating a valve having a rotatable closure, generally referred to in the art as a plug valve.

In Figs. 3 and 4 I show a valve 10a of the type embodying a venturi shaped housing 41. In this instance the plate or closure 42 of the valve is of the type which retracts from the through opening in the valve casing. There is provided an opening 43 which communicates directly with the inside of the housing, in the area of maximum constriction. Connected in the opening 43 is an adaptor 44 to which connects a tube 32a, similar to the tube 32, and which leads to the manometer 34. A tube 37a, similar to the tube 37, connects to the conduit or line 24 on the upstream side of the valve.

In operation, the valve just described functions substantially identical with respect to the one already described. The only difference is that no matching hole similar to the hole or opening 28 is required in the closure 42. It will be seen that pressure differential is indicated by the manometer 34 when applied to valve 10a in the same manner that the same is indicated when applied in the manner shown to valve 10.

In Fig. 5 I show a valve 10b having a casing or housing 46 with a cylindrical passage therethrough. On the upstream side of the valve I interpose a frusto-conical member 47 which is effective to provide a restricted area similar to the restricted area sections of the venturi housings of valves 10 and 10a. Provided in a side of the housing is an opening 48 to which is connected a tube 32b in turn connected to the manometer 34. A tube 37b, fully equivalent to the tube 37, is connected to the pipe 24 on the upstream side of the valve 10b.

In Fig. 6 I show a valve 10c embodying a venturi housing 49. Rotatably disposed in the housing is a plug 51 having a through opening 52 therein. The plug is rotated by means of a hand wheel 53 through gears, not shown, and a stem 54 made fast to the plug 51. In the manner explained with respect to valve 10, I provide openings 56 through the valve housing 49 and through the plug 51, into the through opening 52 therein, thus affording a passage to the inside of the valve when the same is in open position as illustrated in Fig. 6. A tube 32c connects the restricted valve opening to the manometer 34 while a tube 37c connects the manometer to the conduit 24 on the upstream side of the valve 10c.

From the foregoing the method of construction and using my improved valve in either of its forms will be readily understood. By providing the opening in the area of maximum constriction of the several types of valves, I obtain a connection to the point of least pressure (maximum velocity). The connection 37, 37a, 37b or 37c, as the case may be, is the connection at which the highest pressure is obtained. By applying an empirical constant which is obtained experimentally by checking the accuracy of the flow per unit of time of the valve against a known or standard measuring device, I am enabled to determine accurately the flow through either of the valves illustrated.

In the event a valve having a cylindrical housing is used, the same can be easily converted to a venturi type of valve by means of the frusto-conical member 47 interposed on the upstream side.

With either form of my invention it will be appreciated that the normal fluid controlling features and operation of the valve is not affected by associating my invention therewith and that I thus make dual use of the valve. In practice I have found that my improved valve is satisfactory in every way and appreciable economy is affected through its use in that it may eliminate expensive and complicated measuring apparatus. As is understood, in lines such as gas lines, water lines and the like, valves are required at intervals. Therefore, in order to convert an existing valve to a measuring instrument and at the same time maintain the valve's efficiency, one has but to utilize the principles of my invention and connect the openings as illustrated to a pressure differential indicating mechanism.

While I have shown my invention in several forms, it will be obvious to those skilled in the art that it is not so limited, but is susceptible of various other changes and modifications without departing from the spirit thereof, and I desire therefore, that only such limitations shall be placed thereupon as are specifically set forth in the appended claim.

What I claim is:

A fluid control valve comprising a housing having a generally venturi shaped fluid passageway therethrough, a slidable closure member located in the throat of the venturi, said closure member having a through opening therein alignable with the fluid passageway in the housing to open the valve, seal means in said housing coacting with the closure member for sealing against loss of fluid around the the opening in the closure member when the valve is open, there being a passage in the valve closure member opening at one end into the through opening thereof and with the other end opening at one side of the closure member, there being a passage through the side wall of said housing with which the passage in the closure member communicates when the valve is open, said closure member and said housing coacting to seal said passages against loss of fluid around the adjacent ends thereof when the valve is open, whereby there exists an uninterrupted pressure transmitting connection through the housing and closure directly into the throat of the valve.

References Cited in the file of this patent
UNITED STATES PATENTS

| Number | Name | Date |
|---|---|---|
| 1,249,601 | Ferranti | Dec. 11, 1917 |
| 1,298,471 | Dodge | Mar. 25, 1919 |
| 1,631,481 | Gfeller | June 7, 1927 |
| 1,946,319 | Hodgson et al. | Feb. 6, 1934 |
| 1,995,490 | Wilkinson | Mar. 26, 1935 |
| 2,329,418 | Perrson | Sept. 14, 1943 |
| 2,585,290 | Walker | Feb. 12, 1952 |